Jan. 21, 1969 B. G. PRINGLE 3,423,600
TIME RELAY AND PULSE GENERATOR CIRCUIT
Filed Aug. 31, 1966
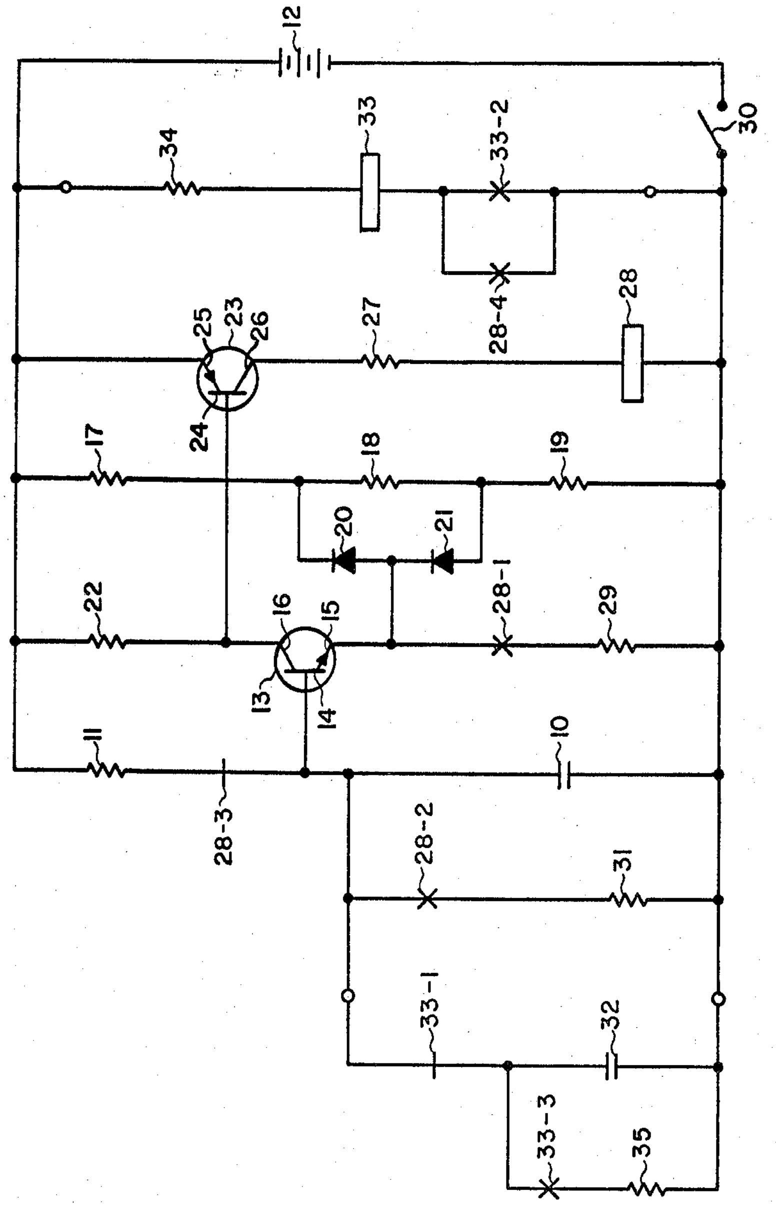
INVENTOR
BRUCE G. PRINGLE
BY Curphey + Erickson
PATENT AGENTS

United States Patent Office 3,423,600
Patented Jan. 21, 1969

3,423,600

TIME RELAY AND PULSE GENERATOR CIRCUIT

Bruce G. Pringle, Ottawa, Ontario, Canada, assignor to Northern Electric Company Limited, Montreal, Quebec, Canada

Filed Aug. 31, 1966, Ser. No. 576,422
U.S. Cl. 307—132 4 Claims
Int. Cl. H01h *47/18, 51/34*

This invention relates to a time delay and pulse generator circuit which may be advantageously used to produce a plurality of alarm pulses in a transmission system after a predetermined initial time delay.

In many fields, it is desired to transmit a plurality of pulses preceded by an initial time delay, after actuation of the circuit. For instance, in cable transmission systems which are subject to stray noise pulses and radio transmission systems which are subject to short interval fades, the immediate actuation of an alarm upon detection of a transmission signal failure, would result in unnecessary and unwanted alarms being generated. It is, therefore, desired to have a circuit which will produce an alarm in the form of a plurality of pulses only after an initial time interval has passed. In addition the length of the pulses must be accurately controlled in order that there be proper actuation of the alarm equipment.

To provide an accurate time interval for the pulses, it has previously been proposed that a relaxation oscillator utilizing the exponential charging and discharging of a resistor-capacitor (RC) network be used. One disadvantage of many of these timing circuits is that voltage variations, across the capacitor resulting from power supply fluctuations, vary the time interval of the generated pulses.

It has been discovered that by connecting the base of a transistor to the junction of the RC network and varying the emitter voltage, by utilizing a plurality of resistors and diodes so that the switching voltage on the emitter follows the power supply fluctuations, that an accurate time delay and pulse generator circuit can be made; the time interval of which is relatively free from power supply fluctuations.

In accordance with the present invention, the time delay and pulse generator circuit comprises a capacitor and resistor connected in series across a source of voltage with the base of a transistor connected to the junction thereof. To prevent power supply fluctuations from affecting the time interval of the generated pulses, the circuit includes a voltage divider network comprising three resistors connected in series across the source of voltage. Connected across the middle resistor, in series aiding relationship, are two diodes; the junction of which is connected to the emitter of the transistor. Also provided is a load circuit connected between the collector and one end of the power supply; and means responsive to current flow through the load for connecting a resistor between the emitter and the other end of the power supply; and for connecting another resistor in parallel with the capacitor.

In a preferred embodiment of the invention the means responsive to current flow through the load comprises, a second transistor connected in series with a relay coil across the power supply with the base of the transistor being connected to the collector of the first transistor. Separate pairs of make contacts actuated by the relay coil are connected in series with each of the resistors. In addition, the circuit is readily adaptable to operate a heavy load through additional contacts on the relay coil.

The circuit is so arranged that there is a voltage differential across the capacitor between the conduction and nonconduction points of the first transistor. Thus, the voltage across the capacitor charges exponentially to a first predetermined level whereupon conduction of the first transistor will commence. This results in a flow of current through the load which in turn causes actuation of the relay. Operation of the relay connects one of the resistors in series with the emitter of the first transistor which changes the cut off point of the transistor to a second predetermined level. At the same time, another of the resistors is connected in parallel with the capacitor which causes it to start discharging exponentially. This continues until the second predetermined level is reached, whereupon conduction of the first transistor ceases. The relay then drops out and the operation is repeated.

An example embodiment of the invention will now be described with reference to the accompanying drawing which illustrates a time delay and pulse generator circuit in accordance with the present invention.

Referring to the figure, the time delay and pulse generator circuit comprises a RC network consisting of a capacitor 10 and a resistor 11 connected effectively in series across a source of voltage 12 through a control switch 30. The circuit also comprises a transistor 13 having a base 14, an emitter 15 and a collector 16; and a load in the form of a resistor 22 which is connected between the collector 16 and one end of the source of voltage 12. In addition, a voltage divider network comprising three resistors 17, 18 and 19 is connected effectively in series across the source of voltage 12 through the switch 30. Connected in series aiding relationship across the middle resistor 18, are two diodes 20 and 21 which are polarized so as to be normally reversed biased by the source of voltage 12. The emitter 15 is connected to the junction of the two diodes 20 and 21, while the base 14 of the transistor 13 is connected to the junction of the capacitor 10 and the resistor 11.

The circuit also comprises means responsive to current flow through the load 22 for discharging the capacitor 10, and altering the cutoff point of the transistor 13. The means comprises a further transistor 23 having a base 24, an emitter 25 and a collector 26. The base 24 is connected to the collector 16 while the emitter 25 is connected to said one end of the source 12. The collector 26 is connected through a current limiting resistor 27 and a relay coil 28 to the other end of the source of voltage 12 through the control switch 30. The means also comprises a resistor 29, connected at one end to the emitter 15 through a pair of make contacts 28–1 and at the other end to the other terminal of the source of voltage 12 through the switch 30. Also a resistor 31 is connected in parallel with the capacitor 10 through a pair of make contacts 28–2; and a pair of break-contacts 28–3 are connected in series with the resistor 11. All the contacts 28–1, 28–2 and 28–3 are actuated by the relay coil 28.

In operation, the switch 30 is closed by any suitable means. For instance, if the circuit is being used to generate alarm pulses as a result of a signal failure in a radio or cable transmission system, the switch 30 could take the form of a pair of relay contacts, the coil of which is responsive to loss of signal in the system. Initially, the transistors 13 and 23 are non-conducting. The capacitor 10 commences to charge exponentially through the resistor 11, the break contacts 28–3 and the closed switch 30. When the voltage across the capacitor 10 and thus the voltage on the base 14 exceeds that at the junction of the resistors 17 and 18, which is determined by the values of the resistors 17, 18 and 19 in the voltage divider network, current flow commences from the source of voltage 12 through the load 22, the collector 16 and emitter 15, the diode 20, the resistors 18 and 19, and the switch 30 back to the source of voltage 12. In turn, the voltage drop across the resistor 22 due to the current flow causes the transistor 23 to become heavily conducting which results in operation of the relay coil 28.

Operation of the relay coil 28 closes the make contacts 28–1 and 28–2, and opens the break contacts 28–3. Closing of the make contacts 28–1 couples the resistor 29 to the emitter 15. At the same time, closing of the make contacts 28–2 and opening of the break contacts 28–3 results in the capacitor 10 commencing to discharge exponentially through the resistor 31. Since the voltage on the emitter 15 follows that on the base 14, the diode 20 turns off. However, since the resistor 29 has been connected to the emitter 15, current continues to flow through the transistor 13.

When the contacts 28–1 are closed, the voltage on the emitter 15 cannot fall below that at the junction of resistors 18 and 19, since the diode 21 will then be forward biased and current will flow from this junction through the diode 21 and the resistor 29 back to the other end of the source 12. At other times when the base 14 of the transistor 13 is below the voltage at the junction of the resistors 17 and 18, the diodes 20 and 21 and the transistor 14 are cut off. Thus, when the voltage on the base 14 falls below that at the junction of the resistors 18 and 19, the emitter 15 is held at that voltage, and the base-emitter junction of transistor 13 is reverse biased. This causes the transistor 13 to become nonconducting which in turn cuts off the transistor 23 thereby resulting in the deactuation of the relay 28 which again opens the make contacts 28–1 and 28–2 and closes the break contacts 28–3.

The capacitor 10 then commences to recharge exponentially through the resistor 11 and the timing sequence repeats itself resulting in the periodic opening and closing of the relay coil 28 which through additional contacts (not shown) can generate a series of timing pulses of a predetermined time interval after an initial time delay.

If at the beginning of the cycle, the switch 30 is momentarily closed and the capacitor 10 commences to charge but has not yet generated the first pulse resulting from operation of the relay coil 28, opening of the switch 30 will result in discharge of the capacitor 10 through the resistors 11, 17, 18 and 19. Thus, the initial delay will always be the same.

In a typical embodiment of the invention, the circuit values were chosen so that the initial time delay was 300 milliseconds while the pulses were generated at a 250 millisecond on and 250 millisecond off rate, due to operation of the relay 28. The initial time delay 10, can be made longer or shorter, as can the rate of generation of the pulses by the operation of the relay 28, providing the actuation time of the relay 28 is not exceeded.

If a much longer initial time delay is desired, this can be readily accomplished by connecting an additional capacitor 32 in shunt with the capacitor 10. To provide the required time interval for the generated pulses once the initial time delay is completed, the capacitor 32 is connected across the capacitor 10 through a pair of break contacts 33–1 which are controlled by a relay coil 33. The relay coil 33 is in turn connected across the source of voltage 12 through a current limiting resistor 34, and either make contacts 28–4 of the relay 28 of self-holding contacts 33–2 of the relay 33, and the switch 30. In addition, a separate discharge resistor 35 is connected across the capacitor 32 through make contacts 33–3 of the relay 33.

During the initial charging period, the capacitor 32 is connected in parallel with the capacitor 10, the total value of which will determine the length of the initial delay, which can readily be in the order of 10 to 15 seconds. Upon actuation of the relay coil 28 as hereinbefore explained, the make contacts 28–4 close thereby actuating the relay coil 33 which in turn closes the self-holding contacts 33–2. At the same time, the break contacts 33–1 open and the make contacts 33–3 close thereby discharging the capacitor 32 through the resistor 35. Since the relay coil 33 is now held operated by the self-holding contacts 33–2, the capacitor 32 will not affect the timing interval of the generated pulses until the circuit is again reset by the opening of the switch 30.

Wide variations in the source of voltage 12 do not appreciably affect the time delay or the time interval of the pulses generated by the relay since the operate and release voltages set by resistors 17, 18 and 19 vary in proportion to the voltage that the capacitors 10 and 32 are charging to. Thus, a plurality of accurately timed pulses can be readily generated in a circuit which will operate under the widely varying conditions in temperature and supply voltage with very little change in the timing interval of the generated pulses.

What is claimed is:

1. A time delay and pulse generator circuit comprising: a transistor having a base, an emitter and a collector; a direct current source of voltage; a load connected between the collector and one end of said source of voltage; a capacitor connected between the base and the other end of said source of voltage; a first resistor connected between the base and said one end of the source of voltage; second, third and fourth resistors connected in series across said source of voltage, said third resistor being located intermediate said second and fourth resistors; first and second diodes connected in series aiding across said third resistor so as to be normally back-biased by said source of voltage; the junction of said first and second diodes being connected to the emitter; means responsive to current flow through said load for connecting a fifth resistor between the emitter and said other end of the source of voltage, and also for connecting a sixth resistor in parallel with said capacitor.

2. A circuit as defined in claim 1 in which the load comprises a seventh resistor; and in which the means responsive to current flow through said load comprises: a further transistor, of opposite conductivity type to said transistor, having a base, an emitter and a collector; and a relay having a coil connected between the collector of said further transistor and said other end of the source of voltage, said relay including a first pair of make contacts connected in series with said fifth resistor, and a second pair of make contacts connected in series with said sixth resistor; the base of said further transistor being connected to the collector of said transistor, and the emitter of said further transistor being connected to said one end of the source of voltage.

3. A circuit as defined in claim 2 additionally comprising a current limiting resistor connected in series with said coil; and in which said relay additionally comprises a pair of break contacts connected in series with said first resistor.

4. A circuit as defined in claim 3 additionally comprising a further capacitor connected effectively in parallel with said capacitor and means responsive to the initial actuation of said relay for disconnecting and discharging said further capacitor.

References Cited

UNITED STATES PATENTS

| | | | |
|---|---|---|---|
| 2,852,702 | 9/1958 | Pinckaers | 307—132 |
| 2,944,191 | 7/1960 | Kapteyn | 315—224 X |
| 3,378,693 | 4/1968 | Schmidt | 307—132 |

LEE T. HIX, *Primary Examiner.*

J. D. TRAMMELL, *Assistant Examiner.*

U.S. Cl. X.R.

307—141.4; 317—142